United States Patent
Sharp et al.

(10) Patent No.: US 8,220,755 B2
(45) Date of Patent: Jul. 17, 2012

(54) HINGE RIB

(75) Inventors: Kim Sharp, Bristol (GB); David Hoptroff, Bristol (GB)

(73) Assignee: Airbus Operations Limited, Bristol (GB)

( * ) Notice: Subject to any disclaimer, the term of this patent is extended or adjusted under 35 U.S.C. 154(b) by 421 days.

(21) Appl. No.: 12/370,623

(22) Filed: Feb. 13, 2009

(65) Prior Publication Data

US 2009/0217487 A1 Sep. 3, 2009

(30) Foreign Application Priority Data

Feb. 29, 2008 (GB) .................................. 0803691.5

(51) Int. Cl.
*B64C 3/50* (2006.01)
(52) U.S. Cl. ...... 244/215; 244/213; 244/99.2; 244/99.3; 244/89; 244/90 R
(58) Field of Classification Search ........ 244/99.2–99.4, 244/213–217, 87–90 A; 52/645, 646, 655.1; 403/70, 150–161
See application file for complete search history.

(56) References Cited

U.S. PATENT DOCUMENTS

| | | | | |
|---|---|---|---|---|
| 1,645,928 A | * | 10/1927 | Potez | 244/87 |
| 2,376,745 A | * | 5/1945 | Wimer, Jr. et al. | 244/117 R |
| 2,418,060 A | * | 3/1947 | Watter | 244/87 |
| 2,421,960 A | * | 6/1947 | Pagon | 244/117 R |
| 4,399,970 A | | 8/1983 | Evans | |
| 6,401,422 B1 | * | 6/2002 | Olden | 52/645 |
| 7,762,500 B1 | * | 7/2010 | Dhall | 244/218 |

FOREIGN PATENT DOCUMENTS

| | | |
|---|---|---|
| EP | 0154047 A1 | 9/1985 |
| EP | 0210399 A2 | 2/1987 |
| EP | 0239138 A2 | 9/1987 |
| EP | 0947421 A1 | 10/1999 |
| GB | 2079688 A | 1/1982 |
| GB | 2428996 A | 2/2007 |
| WO | 2007096624 A2 | 8/2007 |

OTHER PUBLICATIONS

UK Search Report for GB0803691.5 dated Apr. 29, 2008.

* cited by examiner

*Primary Examiner* — Timothy D Collins
*Assistant Examiner* — Jamie S Stehle
(74) *Attorney, Agent, or Firm* — Lowe, Hauptman, Ham & Berner, LLP

(57) ABSTRACT

A hinge rib for pivotally connecting an aerodynamic control element such as a spoiler or aileron to an aircraft structure. The hinge rib includes a first hinge rib arm having a grain oriented in a first direction and a second hinge rib arm having a grain oriented in a second direction which is not parallel with the first grain direction. The arms may be formed together from a single piece of material, or more typically they are formed separately before being attached together such that the grain of the first arm is not parallel with the grain of the second arm.

15 Claims, 3 Drawing Sheets

HINGE RIB

RELATED APPLICATIONS

The present application is based on, and claims priority from, British Application Number 0803691.5, filed Feb. 29, 2008, the disclosure of which is hereby incorporated by reference herein in its entirety.

FIELD OF THE INVENTION

The present invention relates to a hinge rib for pivotally connecting an aerodynamic control element to an aircraft structure, and an aircraft assembly incorporating such a hinge rib.

BACKGROUND OF THE INVENTION

Traditionally, the support structure between the wing flight controls and the spar/skin overhang on a large passenger aircraft consists of metallic 'A-frame' hinge ribs. These hinge ribs are traditionally formed from an aluminum alloy, attached to upper panels which overhang the rear spar of the wing, and their leading edge is in abutment with the rear spar. Interface loads from the flight control surface and air pressure loads are reacted by the hinge ribs into the rear spar of the wing and into the upper panels The upper panels are normally made of composite materials and they provide stability to the hinge ribs.

Alternative hinge rib designs such as shear webs can offer a more weight-optimized structural solution but may be less efficient in material cost and are worse for systems installation. Also shear webs can also cause significant thermal problems as they will tend to act as baffles to any global airflow that would normally aid the cooling process along the trailing edge of the wing.

Using the traditional single-piece 'A' frame does not make optimum use of the material or billet from which the hinge rib is machined, resulting in a large amount of waste. Also the grain flow in the billet can never be fully structurally optimized in the 'A' frame as the longitudinal grain flow of the material can never be aligned to both the legs of the 'A' frame, which may be at angles of up to 90 degrees to each other.

SUMMARY OF THE INVENTION

A first aspect of the invention provides a hinge rib for pivotally connecting an aerodynamic control element to an aircraft structure, the hinge rib comprising: a first hinge rib arm having a grain oriented in a first direction; and a second hinge rib arm having a grain oriented in a second direction which is not parallel with the first grain direction.

A further aspect of the invention provides an aircraft assembly comprising: an aircraft structure; a hinge rib according to the first aspect of the invention with its first hinge rib arm non-rotatably attached to a first part of the aircraft structure and its second hinge rib arm non-rotatably attached to a second part of the aircraft structure; and an aerodynamic control element pivotally mounted to the hinge rib.

The arms may be formed together from a single piece of material, or more typically they are formed separately before being attached together such that the grain of the first arm is not parallel with the grain of the second arm.

The hinge rib may be adapted in a variety of ways in order to be pivotally connected to the control element. For instance the hinge rib may have a projection which extends along the hinge line and is received in a hole in the control element (or vice versa). Alternatively the control element may be pivotally connected to the hinge rib by a clevis joint, with the clevis being on the side of the hinge rib or on the side of the control element. Alternatively, the control element may be connected to the hinge rib by a halving joint. In the preferred embodiment described below the first and second hinge rib arms have aligned holes at the hinge point.

Typically the first hinge rib arm comprises means, such as a flange, for non-rotatably attaching the first hinge rib arm to a first part of the aircraft structure, and the second hinge rib arm comprises means, such as a flange, for non-rotatably attaching the second hinge rib arm to a second part of the aircraft structure.

The hinge rib arms preferably have inclined surfaces which engage with each other to prevent relative rotation between them.

Most typically the aircraft structure comprises an aerofoil such as a main wing element or a horizontal tail plane. Alternatively the aircraft structure may comprise a vertical tail plane or other element of an aircraft.

The aerodynamic control element may comprise a flap, spoiler, aileron, elevator, rudder, or any other control element pivotally attached to an aircraft structure, typically (although not exclusively) to its trailing edge.

Various other preferred features of the invention are set out in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
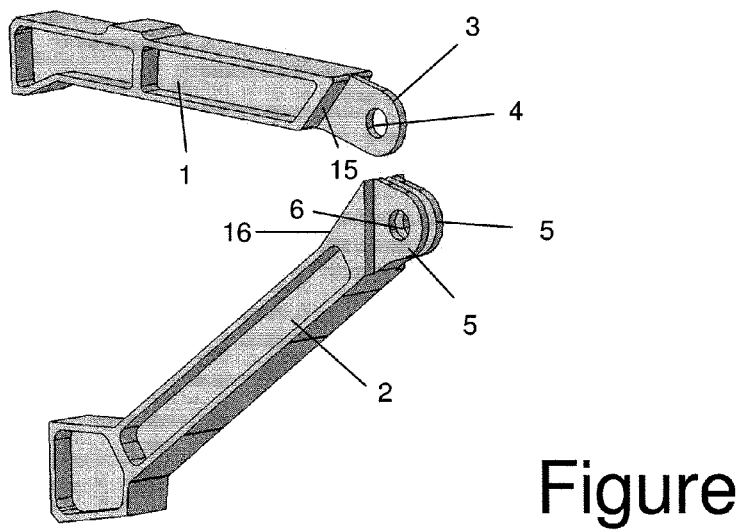
FIG. 1 shows a two-part hinge rib prior to assembly.
Figure 2:
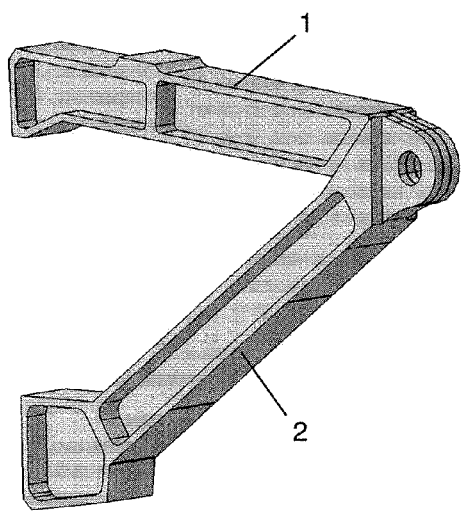
FIG. 2 shows the hinge rib of FIG. 1 in its assembled state.
Figure 3:
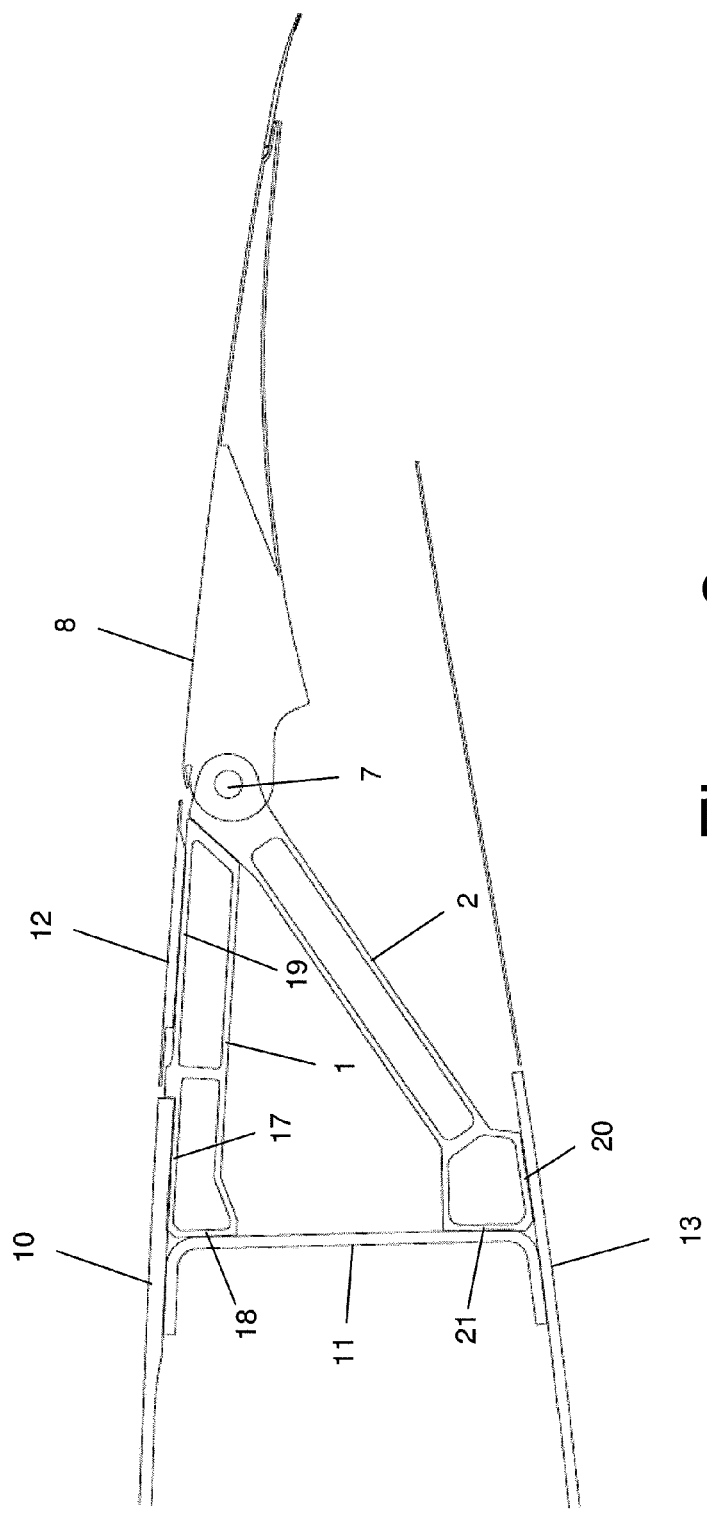
FIG. 3 is a sectional side view showing a spoiler pivotally attached to the trailing edge of an aircraft wing by the hinge rib of FIG. 2.

The hinge rib assembly shown in FIGS. 1 and 2 comprises an upper hinge rib arm 1 and a lower hinge rib arm 2. As shown in FIG. 1, the upper hinge rib arm 1 has a lug 3 on its distal end with a hole 4. The distal end of the lower hinge rib arm 2 carries a pair of lugs 5 each with a hole 6. As shown in FIG. 2, the hinge rib is assembled by fitting the lug 3 between the pair of lugs 5 with the holes 4,6 aligned and the upper hinge rib arm 1 extending longitudinally at an acute angle to the lower hinge rib arm 2. The upper hinge rib arm 1 has a pair inclined flanges 15 which engage a pair of inclined surfaces 16 on the lower hinge rib arm 2 when the arms are brought together, preventing relative rotation of the two arms. As shown in FIG. 3, the holes 4, 6 receive a pin 7 which pivotally attaches the hinge rib assembly to a clevis on a spoiler 8.

In an alternative embodiment (not shown) the clevis may be on the hinge-rib side instead of on the spoiler side. In this case one arm of the clevis is formed by a lug on a distal end of the hinge rib arm 1, and the other arm of the clevis is formed by a lug on a distal end of the hinge rib arm 2.

In a further alternative, one of the lugs 5 on the lower hinge rib arm 2 may be omitted so that the arms 1, 2 are connected together by a halving (or lap) joint.

Similarly, instead of being pivotally connected to the spoiler 8 by a clevis joint, the connection between the hinge rib and the spoiler may be made by a rotating halving (or lap) joint.

As shown in FIG. 3, the upper hinge rib arm 1 has a pair of flanges 17 connected to the overhanging portion of an upper cover 10, a pair of flanges 18 connected to a spar web 11 and a pair of flanges 19 connected to a panel 12. The foot of the lower hinge rib arm 2 has a pair of flanges 20 connected to an overhanging portion of a lower cover 13 and a pair of flanges 21 connected to the spar web 11. Note that only one of each pair of flanges 17-21 is visible in FIG. 13, the other flanges being visible from the other side only. The flanges 17-21 are typically connected to the aircraft structure by bolts or other fasteners. Note that each arm 1,2 is non-rotatably attached to the aircraft structure, so that they do not rotate relative to the aircraft structure as the spoiler is deployed.

The fact that the hinge rib assembly is formed in two parts provides a number of benefits over existing one-part hinge rib designs. Firstly, the amount of wasted material involved in manufacturing the hinge rib may be greatly reduced as the two arms 1, 2 no longer have to be manufactured simultaneously from the same billet of material. Secondly, each arm 1, 2 is manufactured so that the grain direction of the aluminum alloy runs along the length of the arm, optimizing the strength of the material. Thirdly, flexible lines can be installed and/or removed without having to thread them through the hinge rib. Fourthly, the hinge rib assembly may be assembled and/or disassembled without being constrained by the closed angle formed by the upper and lower covers.

Figure 4:
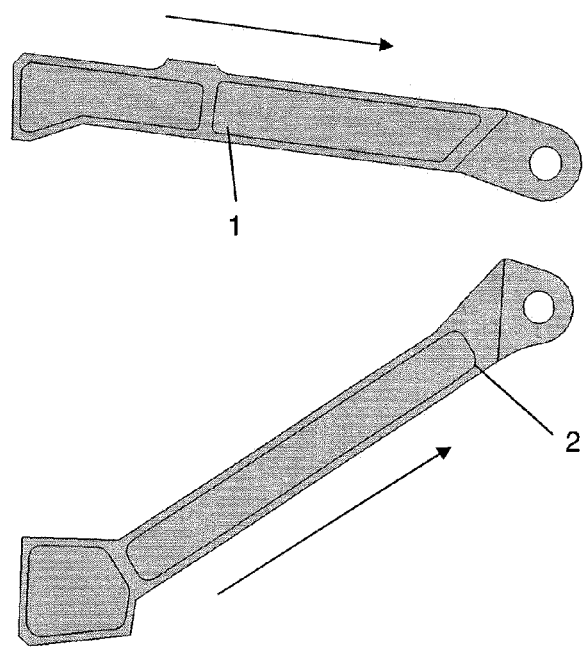
FIG. 4 indicates the grain flow direction of the material in each arm of the hinge rib.

The aluminum alloy billet from which the arms 1, 2 are machined has a single longitudinal grain direction. Typically the billet is manufactured by roll-forming and the grain direction is aligned with the rolling direction. Traditional "A-frames" typically comprise two integrally formed arms, which lie at angles of 45° to each other. As the two arms are formed at the same time from the same billet of material, only one arm can take full advantage of the grain flow. However, here, as the arms 1, 2 are formed separately, each arm can be manufactured separately in line with the longitudinal grain flow of the (perhaps separate) billet. This is illustrated in FIG. 4, wherein the arrows indicate the direction of the longitudinal grain flow. Thus, both arms can take full advantage of the strength of the material. Moreover, the utilization of material from a single billet is improved as more single arms than "A-frames" can be nested into a single billet.

Although the invention has been described above with reference to one or more preferred embodiments, it will be appreciated that various changes or modifications may be made without departing from the scope of the invention as defined in the appended claims.

The invention claimed is:

1. An aircraft hinge rib for pivotally connecting an aerodynamic control element to an aircraft structure, the hinge rib comprising: a first hinge rib arm having a grain oriented in a first direction; and a second hinge rib arm having a grain oriented in a second direction which is not parallel with the first grain direction; wherein said first hinge rib arm has a first inclined surface which is inclined relative to a length of said first hinge rib arm; wherein said second hinge rib arm has a second inclined surface which is inclined relative to a length of said second hinge rib arm; and wherein said first and second inclined surfaces engage with each other to prevent relative rotation between said first and second hinge rib arms.

2. The hinge rib of claim 1 wherein the first hinge rib arm extends longitudinally in the first direction and the second hinge rib arm extends longitudinally in the second direction.

3. The hinge rib of claim 1 wherein the first hinge rib arm extends longitudinally at an acute angle to the second hinge rib arm.

4. The hinge rib of claim 1 wherein the first and second hinge rib arms are connected together at a hinge point.

5. The hinge rib of claim 4 wherein the first and second hinge rib arms have aligned holes at the hinge point.

6. The hinge rib of claim 1 wherein the first hinge rib arm comprises means for attaching the first hinge rib arm to a first part of the aircraft structure, and the second hinge rib arm comprises means for attaching the second hinge rib arm to a second part of the aircraft structure.

7. The hinge rib of claim 1 wherein the first hinge rib arm comprises a flange for attaching the first hinge rib arm to a first part of the aircraft structure, and the second hinge rib arm comprises a flange for attaching the second hinge rib arm to a second part of the aircraft structure.

8. The hinge rib of claim 1 wherein said first inclined surface comprises a flange.

9. An aircraft assembly comprising:
   an aircraft structure;
   a hinge rib comprising a first hinge rib arm having a grain oriented in a first direction non-rotatably attached to a first part of the aircraft structure and a second hinge rib arm having a grain oriented in a second direction which is not parallel with the first grain direction non-rotatably attached to a second part of the aircraft structure; and
   an aerodynamic control element pivotally mounted to the hinge rib at a hinge point; and,
   wherein said first and second hinge rib arms are connected together at said hinge point.

10. The assembly of claim 9 wherein the aircraft structure comprises a rear spar; an upper cover which is attached to the rear spar and overhangs to its rear; and a lower cover which is attached to the rear spar and overhangs to its rear; and wherein the first hinge rib arm is attached to one of the covers and the second hinge rib arm is attached to the other one of the covers.

11. The assembly of claim 10 wherein the first and second hinge rib arms are also each attached to the rear spar.

12. The assembly of claim 10 wherein one of the hinge rib arms extends substantially parallel with the cover to which it is attached.

13. The assembly of claim 9 wherein said first and second hinge rib arms have aligned holes at said hinge point.

14. An aircraft assembly comprising:
   an aircraft structure;
   a hinge rib comprising a first hinge rib arm having a grain oriented in a first direction non-rotatably attached to a first part of the aircraft structure and a second hinge rib arm having a grain oriented in a second direction which is not parallel with the first grain direction non-rotatably attached to a second part of the aircraft structure; and
   an aerodynamic control element pivotally mounted to the hinge rib at a hinge point;
   wherein said first hinge rib arm has a first inclined surface which is inclined relative to a length of said first hinge rib arm; wherein said second hinge rib arm has a second inclined surface which is inclined relative to a length of said second hinge rib arm; and wherein said first and second inclined surfaces engage with each other to prevent relative rotation between said first and second hinge rib arms.

15. An aircraft hinge rib for pivotally connecting an aerodynamic control element to an aircraft structure, the hinge rib comprising: a first hinge rib arm having a grain oriented in a first direction, the first hinge rib arm having a distal end; and a second hinge rib arm having a grain oriented in a second direction which is not parallel with the first grain direction, the second hinge rib arm having a distal end; wherein said first hinge rib arm has a first lug on its distal end; wherein said distal end of said second hinge rib arm carries a pair of lugs having a space therebetween, and wherein said first lug is positioned within said space between said pair of lugs.

* * * * *